United States Patent
AlDhufairi et al.

(10) Patent No.: US 10,563,113 B2
(45) Date of Patent: Feb. 18, 2020

(54) REMOVAL OF BARITE WEIGHTED MUD

(71) Applicants: Saudi Arabian Oil Company, Dhahran (SA); Industrial and Mechanical Services Co. Ltd, Dammam (SA)

(72) Inventors: Mubarak Aoudah AlDhufairi, Dammam (SA); Saif Ahmed Al-Thabit, Dammam (SA)

(73) Assignees: Saudi Arabian Oil Company, Dhahran (SA); Industrial and Mechanical Services Co. Ltd, Dammam (SA)

( * ) Notice: Subject to any disclaimer, the term of this patent is extended or adjusted under 35 U.S.C. 154(b) by 0 days.

(21) Appl. No.: 15/398,989

(22) Filed: Jan. 5, 2017

(65) Prior Publication Data

US 2017/0190951 A1    Jul. 6, 2017

Related U.S. Application Data

(60) Provisional application No. 62/275,041, filed on Jan. 5, 2016.

(51) Int. Cl.
*C09K 8/528* (2006.01)
*C09K 8/524* (2006.01)
*E21B 21/00* (2006.01)
*E21B 37/00* (2006.01)

(52) U.S. Cl.
CPC .............. *C09K 8/528* (2013.01); *C09K 8/524* (2013.01); *E21B 21/00* (2013.01); *E21B 37/00* (2013.01); *C09K 2208/24* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 5,093,020 A | 3/1992 | Paul | |
| 6,602,837 B1 * | 8/2003 | Patel | C11D 3/33 510/221 |
| 6,818,594 B1 | 11/2004 | Freeman et al. | |
| 9,206,673 B2 | 12/2015 | Thaemlitz | |
| 10,294,407 B2 * | 5/2019 | Ba Geri | C09K 8/524 |
| 2004/0014606 A1 * | 1/2004 | Parlar | C09K 8/52 507/100 |
| 2005/0257932 A1 * | 11/2005 | Davidson | C09K 8/04 166/304 |

(Continued)

FOREIGN PATENT DOCUMENTS

WO    2012/001396    1/2012

OTHER PUBLICATIONS

Ba Geri, B.S. et al.; "Single State Filter Cake Removal of Barite Weighted Water Based Drilling Fluid"; Journal of Petroleum Science and Engineering; vol. 149; Nov. 2, 2016; pp. 476-484.

(Continued)

*Primary Examiner* — Andrew Sue-Ako
(74) *Attorney, Agent, or Firm* — Fish & Richardson P.C.

(57) ABSTRACT

A composition for dissolving drilling mud including barite particles and a polymer includes an enzyme capable of reacting with the polymer; a chelating agent capable of dissolving the barite particles; and a catalyst capable of promoting a reaction between the chelating agent and the barite particles.

5 Claims, 9 Drawing Sheets

(56) References Cited

U.S. PATENT DOCUMENTS

| | | |
|---|---|---|
| 2007/0163779 A1 | 7/2007 | Rae |
| 2008/0076682 A1 | 3/2008 | Jones |
| 2008/0139416 A1 | 6/2008 | Rimassa |
| 2008/0281000 A1* | 11/2008 | Daly ................. C08B 37/0096 514/778 |
| 2010/0200499 A1* | 8/2010 | Szwajcer Dey ........ C02F 1/683 210/606 |
| 2011/0005773 A1* | 1/2011 | Dusterhoft ............... C09K 8/52 166/376 |
| 2011/0214862 A1* | 9/2011 | Horton .................... C09K 8/03 166/283 |
| 2012/0208726 A1 | 8/2012 | Smith |
| 2015/0057212 A1 | 2/2015 | Hulskotter |
| 2017/0145289 A1* | 5/2017 | Ba Geri ................ C09K 8/524 |

OTHER PUBLICATIONS

International Search Report and Written Opinion of the International Searching Authority issued in International Application No. PCT/US2017/012357 dated May 4, 2017; 16 pages.

Gulf Cooperation Council Examination issued in GCC Application No. GC 2017-32729 on Oct. 15, 2019, 4 pages.

* cited by examiner

REMOVAL OF BARITE WEIGHTED MUD

CLAIM OF PRIORITY

This application claims priority under 35 USC § 119(e) to U.S. patent application Ser. No. 62/275,041, filed on Jan. 5, 2016, the entire contents of which are incorporated here by reference.

BACKGROUND

Drilling mud introduced into an oil or natural gas well forms a filter cake on the drilling formations in the well. The filter cake helps to control the well, for instance, by providing sufficient hydrostatic head to overcome the reservoir pressure exerted by the reservoir of oil or natural gas accessed by the well. For high pressure formations, heavy drilling mud that contains high density solids can be used. For instance, barite can be used as a weighting material in heavy mud introduced into high pressure formations.

SUMMARY

In a general aspect, a composition for dissolving drilling mud including barite particles and a polymer includes an enzyme capable of reacting with the polymer; a chelating agent capable of dissolving the barite particles; and a catalyst capable of promoting a reaction between the chelating agent and the barite particles.

Embodiments can include one or more of the following features.

The polymer includes xanthan gum biopolymer, and in which the enzyme is capable of degrading the xanthan gum biopolymer. Degraded components of the xanthan gum biopolymer are soluble in the composition.

The enzyme includes carbohydrase enzyme.

The chelating agent includes one or more of diethylene triamine pentaacetic acid (DTPA) or ethylenediaminetetraacetic acid (EDTA).

The catalyst includes a salt, such as a carbonate salt.

The composition includes an aqueous solution.

The composition includes an aqueous solution including 10% by weight carbohydrase enzyme; 10% by weight carbohydrate salt; 20% by weight diethylene triamine pentaacetic acid; and 60% by weight water.

In a general aspect, a method includes introducing a mud removal fluid into a drilling well containing drilling mud, the drilling mud including barite particles and xanthan gum biopolymer. The mud removal fluid includes an enzyme capable of reacting with the xanthan gum biopolymer; a chelating agent capable of dissolving the barite particles; and a catalyst capable of promoting a reaction between the chelating agent and the barite particles. The method includes soaking the mud removal fluid in the drilling well for an amount of time sufficient to dissolve at least some of the barite particles; and removing the mud removal fluid from the drilling well.

Embodiments can include one or more of the following features.

The method includes soaking the mud removal fluid in the drilling well for at least 24 hours.

Soaking the mud removal fluid in the drilling well includes mixing, pulsing, or aerating the mud removal fluid in the drilling well.

The drilling well contains a filter cake formed of the drilling mud and in which soaking the mud removal fluid in the drilling well includes soaking the mud removal fluid for an amount of time sufficient to dissolve at least some of the filter cake.

The enzyme capable of reacting with the xanthan gum polymer includes an enzyme capable of degrading the xanthan gum biopolymer.

The removed mud removal fluid includes dissolved barite and degraded components of xanthan gum biopolymer.

The enzyme includes carbohydrase enzyme.

The chelating agent includes one or more of diethylene triamine pentaacetic acid (DTPA) or ethylenediaminetetraacetic acid (EDTA).

The catalyst includes a salt, such as a carbonate salt.

The approach described here can have one or more of the following advantages. The use of a mud removal fluid including a polymer dissolving component and a barite dissolving component can help remove filter cake formed of barite weighted mud. Removal of barite weighted mud from a well prevents barite particles from being transported through oil or natural gas flow pipelines, thus reducing erosion and flow failure that can be caused by the barite particles. Removal of barite filter cake can also help the well to produce at higher flow rates, thus stimulating oil production.

Other features and advantages are apparent from the following description and from the claims.

DETAILED DESCRIPTION

This disclosure relates to an approach to removing filter cake formed of barite-weighted mud from a well at the conclusion of drilling operations. Barite-weighted mud is composed of barite particles encased in a polymer matrix. Barite-weighted mud filter cake is dissolved by exposing the filter cake to a mud removal fluid that includes a component capable of dissolving the polymer matrix and a component capable of dissolving the barite particles.

Figure 1A:
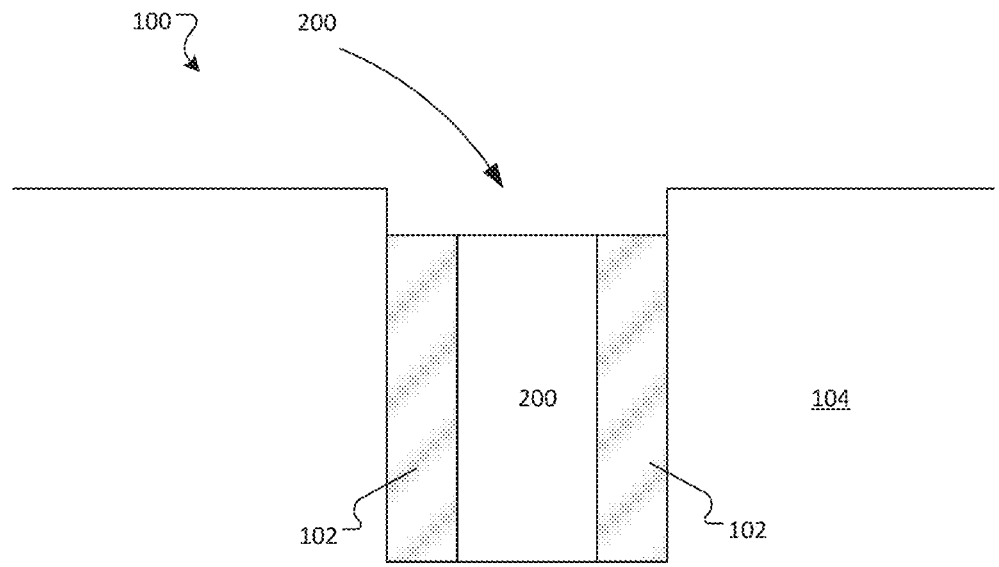
FIG. 1A is a diagram of a drilling formation.

Referring to FIG. 1A, a water based drilling mud 200 is introduced into a well 100, such as an oil well or a natural gas well, during drilling operations. Drilling mud 200 forms a filter cake 102 on the drilling formation in well 100, thus providing sufficient hydrostatic head to overcome the reservoir pressure exerted by an underground reservoir 104 of oil or natural gas and preventing leakage between well 100 and reservoir 104. Following completion of drilling operations, filter cake 102 and remaining drilling mud 200 is removed. Failing to remove filter cake 102 or other remaining drilling mud 200 can result in drilling mud 200 being transported along oil or natural gas flow paths, which can cause erosion to flow chokes. Removal of barite filter cake can also help the well to produce at higher flow rates, thus stimulating production.

Figure 1B:
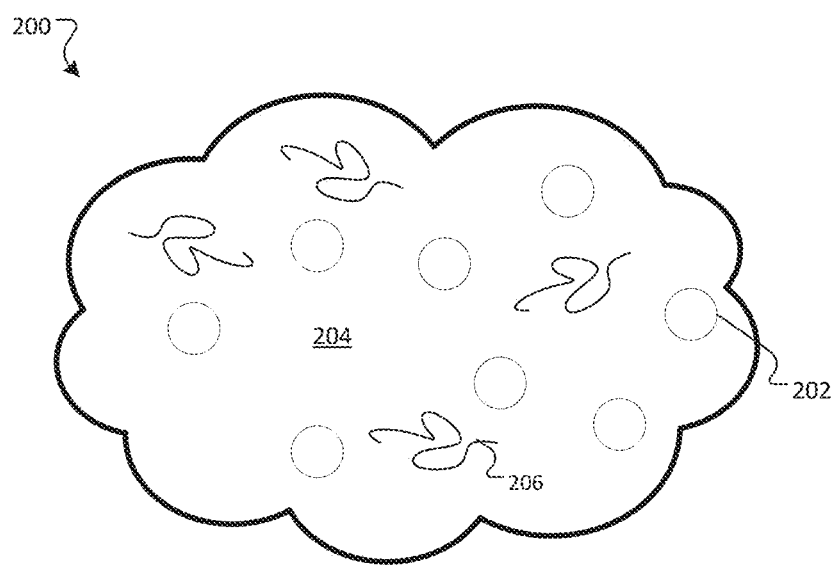
FIG. 1B is a diagram of barite weighted mud.

When drilling in high pressure drilling formations, drilling mud 200 includes high density solids that act as weighting materials capable of resisting the high pressure exerted by reservoir 104. For instance, drilling mud 200 that includes barite as a weighting material, sometimes referred to as barite weighted mud, can be used in high pressure drilling operations. Referring to FIG. 1B, barite weighted mud 200 includes barite particles 202 mixed with mud 204 including a polymer 206. For instance, the polymer 206 can be Xanthan gum biopolymer (XC-polymer), which is a high molecular weight polysaccharide that is produced by fermentation of carbohydrate. XC-polymer is often used in drilling operations, for instance, as a viscosifier for oilfield drilling, workover, and completion fluids, and as result is often found in drilling muds.

Removal of barite weighted mud 200 from well 100 is complicated by the presence of XC-polymer 206 that partially or completely encases barite particles 202. In general, XC-polymer 206 cannot be dissolved or degraded by solvents or acids that are capable of dissolving barite, such as inorganic and organic acids, solvents, esters, oxidizers, and chelating agents. XC-polymer 206 thus acts as a non-degradable barrier that inhibits contact between the solvent or acid and barite particles 202, preventing barite particles 202 from being dissolved. As a result, barite weighted mud 200 cannot be readily dissolved and removed from well 100 even using solvents or acids that are capable of dissolving barite itself.

Figure 1C:
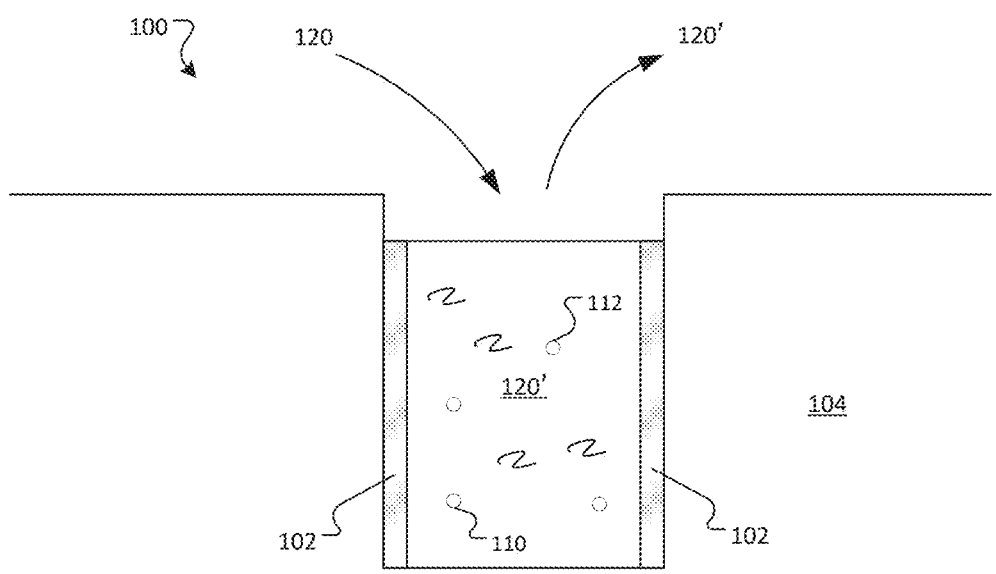
FIG. 1C is a diagram of a drilling formation.

Referring also to FIG. 1C, in order to remove barite weighted mud 200 from well 100 following drilling operations, mud removal fluid 120 is introduced into well 100, for instance, after drilling operations are concluded. Mud removal fluid 120 includes one or more polymer-reacting components that are capable of degrading the polymer component 206 (for instance, XC-polymer) of the barite weighted mud and one or more barite-dissolving components that are capable of dissolving the barite particles 202. The polymer-reacting component of mud removal fluid 120 degrades the XC-polymer 206, exposing the barite particles 202 encased within the XC-polymer 206 to mud removal fluid 120. The barite-dissolving component of mud removal fluid 120 can then dissolve barite particles 202. In some examples, mud removal fluid 120 also includes a catalyst that accelerates or promotes reaction between barite particles 202 and the barite-dissolving component of mud removal fluid 120.

The polymer-reacting component of mud removal fluid 120 can be an enzyme, such as a carbohydrase enzyme, that is capable of degrading XC-polymer. For instance, the polymer-reacting component can degrade XC-polymer into smaller components that can be suspended or dissolved in the mud removal fluid 120. The enzyme can be a bare, non-encapsulated enzyme. Example carbohydrase enzymes include amylase, maltase, sucrose, lactase, or other carbohydrase enzymes. The enzyme can be an enzyme that functions within a certain pH range, such as a pH greater than 8, greater than 9, greater than 10, greater than 11, greater than 12, or in another range. The enzyme can be activated without a triggering signal.

The barite-dissolving component of mud removal fluid 120 can be a chelating agent, such as diethylene triamine pentaacetic acid (DTPA), ethylenediaminetetraacetic acid (EDTA), or another chelating agent, that is capable of dissolving barite particles 202. The mud removal fluid 120 can also include a catalyst that helps the chelating agent to dissolve the barite, for instance by promoting and accelerating the reaction between the chelating agent and barite. Example catalysts can include carbonate salts such as sodium carbonate or potassium carbonate, sodium hydroxide, potassium hydroxide, potassium chloride, iron chloride, cesium chloride, or other catalysts.

The mud removal fluid 120 can be an aqueous solution including at least about 1% by weight carbohydrase enzyme, such as between about 1% and 15% carbohydrase enzyme or between about 5% and 15% carbohydrase enzyme, such as about 1%, about 2%, about 5%, about 10%, about 15%, or another amount. The mud removal fluid can include at least about 1.0% by weight chelating agent, such as between about 5% and 40% chelating agent, such as about 5%, about 10%, about 15%, about 20%, about 25%, about 30%, about 35%, about 40%, or another amount. The mud removal fluid can include at least about 0.5% by weight catalyst, such as between about 5% and 20% catalyst, such as about 5%, about 10%, about 15%, about 20%, or another amount. A specific example of a mud removal fluid is an aqueous solution with 10% by weight carbohydrase enzyme, 10% by weight carbonate salt, and 25% by weight diethylene triamine pentaacetic acid.

Referring still to FIG. 1C, when mud removal fluid 120 is introduced into well 100, the polymer-reacting component of mud removal fluid 120 degrades polymer 206 coating barite particles 202 (FIG. 1B). The barite-dissolving component of mud removal fluid 120 can then come into contact with and dissolve barite particles 202. As the polymer 206 is degraded and the barite particles 202 are dissolved, the filter cake 102 gradually becomes thinner (as shown in FIG. 1C) and in some cases can be completely removed. Mud removal fluid 120', including degraded components 110 of the polymer and dissolved barite 112, can be removed from well 100. By treating barite weighted mud 200 with mud removal fluid 120, the removal of barite weighted mud 200 from well 100 can be enhanced compared with treatment by ordinary solvents or acids, such as enhanced by a factor of two.

In some cases, a high density solid other than barite can be used as a weighting component in a heavy mud introduced into a high pressure drilling formation. Example high density solids can include manganese tetra oxide or hematite. In these cases, mud removal fluid 120 can include a component capable of dissolving the appropriate high density solid.

Figure 2:
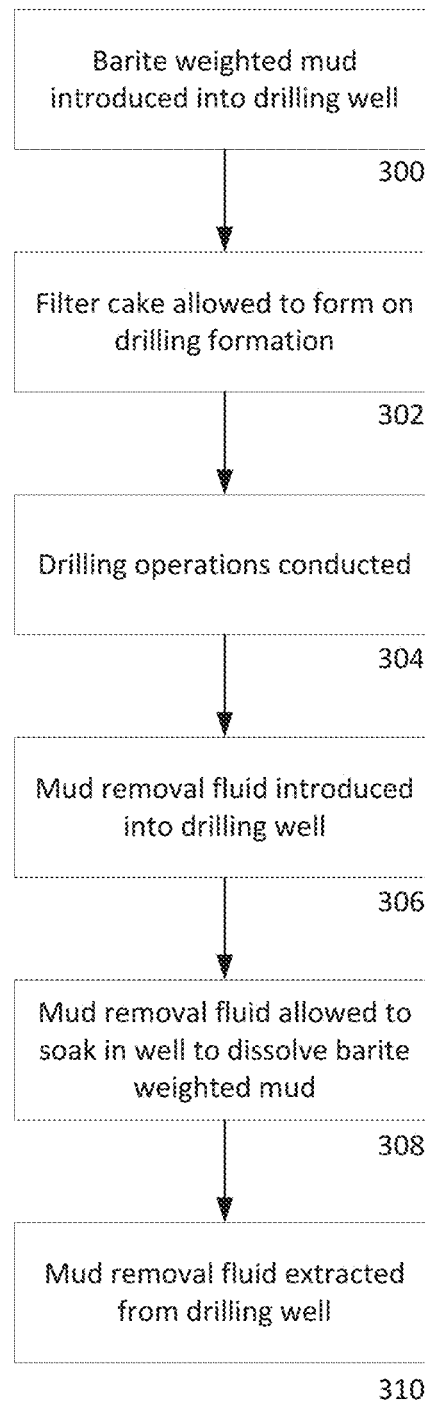
FIG. 2 is a flow chart.

Referring to FIG. 2, in an example process, barite weighted mud is introduced into a drilling well (300) and a filter cake is allowed to form on the drilling formation (302) in order to prevent drilling fluid from leaking into the drilling formation. Drilling operations are conducted (304). When drilling operations conclude, a mud removal fluid is introduced into the drilling well (306) to dissolve the filter cake formed on the drilling formation. The mud removal fluid includes an enzyme that is capable of dissolving a polymer coating the barite particles in the mud and a component, such as a chelating agent, capable of dissolving the barite itself. The mud removal fluid can also include a catalyst capable of promoting the reaction between the chelating agent and the barite.

The mud removal fluid is allowed to soak in the drilling well for an amount of time sufficient to dissolve some or all of the barite weighted mud forming the filter cake on the drilling formation (308). After the desired amount of time has elapsed, the mud removal fluid, which contains polymer and barite dissolved from the barite weighted mud of the filter cake, is extracted from the drilling well (310). For instance, the mud removal fluid is allowed to soak in the well for at least 24 hours, at least 48 hours, at least 72 hours, at least 96 hours, or for another time period. The longer the mud removal fluid is allowed to soak in the formation, the more barite removal will be achieved. The rate of barite removal, and thus the time until complete barite removal is achieved, can depend on factors such as the amount of barite, the temperature in the well, or other factors. In some examples, the mud removal fluid can be allowed to soak for extended time periods beyond the time to achieve removal. For instance, in some operations, the mud removal fluid can soak for few days or weeks before flowback is planned.

In some examples, the mud removal fluid is allowed to soak passively. In some examples, the mud removal fluid is actively mixed in the drilling well, for instance, by physically stirring, pulsing, or agitating the mud removal fluid in the drilling well, aerating the mud removal fluid in the drilling well. The pressure or temperature in the drilling well can be elevated compared to ambient temperature or pressure. For instance, the pressure in the well can be about at least about 1000 psi, such as between 1000 psi and about 10,000 psi, and the temperature in the drilling well can be about 270° F. During the soaking time, at least some of the polymer coating the barite particles in the barite weighted mud is dissolved by the enzyme, thus exposing the barite particles to the chelating agent and the catalyst in the mud removal fluid. At least some of the barite particles in the barite mud are thus also dissolved during the soaking time.

EXAMPLES

The efficiency of mud removal fluid at removing various materials, including dry barite, filter cake solids, and desander solids, was investigated.

Example 1—Treatment of Dry Barite

Dry, industrial grade barite was treated with a mud removal fluid to investigate the ability of the mud removal fluid to dissolve the barite. The mud removal fluid included 10% diethylene triamine pentaacetic acid (DTPA), 10% carbohydrase enzyme, and 20% potassium carbonate salt in an aqueous solution.

X-ray fluorescence (XRF) and a scanning electron microscopy (SEM) were used to determine the composition of the dry barite prior to treatment with the mud removal fluid. The starting composition of the dry barite is shown in Table 1.

TABLE 1

Dry barite composition prior to treatment with mud removal fluid. Weight percents of individual elements may not necessarily add up to 100.00 because of rounding and minor imprecision in the method of analysis.

| Element | Weight percent |
| --- | --- |
| Ba | 72.03 |
| S | 13.12 |
| Na | 10.29 |
| Si | 2.55 |

TABLE 1-continued

Dry barite composition prior to treatment with mud removal fluid. Weight percents of individual elements may not necessarily add up to 100.00 because of rounding and minor imprecision in the method of analysis.

| Element | Weight percent |
| --- | --- |
| Mg | 1.37 |
| Fe | 0.45 |
| Sr | 0.17 |
| Total | 100.00 |

To study the time dependence of barite dissolution, 20 gram (g) samples of dry barite were soaked in 500 g of mud removal fluid at 270° F. for various amounts of time ranging from three hours to 168 hours. After the designated amount of time, the remaining material was weighed and the percentage of solids removed from each sample was calculated. The results of these tests are shown in Table 2. The percentage of solids removed from the dry barite samples increases with increasing exposure time to mud removal fluid.

TABLE 2

Effect of exposure time to mud removal fluid on dissolution of dry barite.

| Test time (hours) | Percentage of barite removed |
| --- | --- |
| 3 | 56.31 |
| 6 | 58.68 |
| 12 | 67.51 |
| 24 | 76.94 |
| 48 | 76.44 |
| 72 | 77.45 |
| 96 | 78.90 |
| 120 | 79.51 |
| 168 | 79.92 |

To study the effect of the ratio of dry barite to mud removal fluid, barite samples of different weights were each soaked in 40 milliliters (mL) of mud removal fluid at 270° F. for 24 hours. Following the soaking, the remaining material was weighed and the percentage of solids removed from each sample was calculated. The results of these tests are shown in Table 3. A lower ratio of dry barite to mud removal fluid results in greater removal of dry barite.

TABLE 3

Effect of the ratio of barite to mud removal fluid on dissolution of dry barite.

| Solid/liquid ratio | Removal percentage |
| --- | --- |
| 1 g/40 mL | 90.7 |
| 2 g/40 mL | 69.25 |
| 3 g/40 mL | 44.9 |
| 4 g/40 mL | 39.17 |

Example 2—Treatment of Filter Cake Solids

Wet and dry filter cake solids and actual filter cakes were treated with mud removal fluid to investigate the ability of the mud removal fluid to dissolve various types of filter cake solids. The mud removal fluid included 10% diethylene triamine pentaacetic acid (DTPA), 10% carbohydrase enzyme, and 20% potassium carbonate salt in an aqueous solution.

To study the removal of filter cake solids, filter cake drilling mud was collected from the mud tanks of an actual drilling operation. The properties of the mud used in the following examples are given in Table 4, where HTHP refers to a high temperature, high pressure cell, and the formulation of the mud is given in Table 5.

TABLE 4

Properties of filter cake drilling mud.

| Property | Value | Units |
| --- | --- | --- |
| Density | 120 | pounds per cubic foot (lb/ft$^3$) |
| PV | 30-40 | centipoise (cP) |
| YP | 24-26 | pounds per 100 square feet (lb/100 ft$^2$) |
| 10 sec gel | 10-20 | lb/100 ft$^2$ |
| 10 min gel | 15-25 | lb/100 ft$^2$ |
| Filtrate, HTHP @ 320° F./500 psi | 18-24 | milliliters per 30 minutes (mL/30 min) |
| HTHP cake | $1/32^{nd}$-$3/32^{nd}$ | inches (in) |
| pH | 9-10 | |
| MBT active clay | 4.0-6.0 | pounds per barrel (lb/bbl) |
| Ca$^-$ | 150,000 | milligrams per liter (mg/L) |

TABLE 5

Components of filter cake drilling mud.

| Component | Amount | Units |
| --- | --- | --- |
| Water | 0.691 | barrels (bbl) |
| Bentonite | 4 | pounds (lb) |
| XC-polymer | 0.5 | lb |
| filtration control agent | 0.25-0.50 | lb |
| KCl | 20.0 | lb |
| KOH | 0.5 | lb |
| NaCl | 66 | lb |
| Barite | 352.0 | lb |
| CaCo$_3$ medium | 5.0 | lb |
| Sodium sulfite | 0.25-0.30 | lb |
| Lubricant | 1.0-2.0 | lb |
| HPHT and dynamic fluid loss control | 0.3-0.56 | gallons (Gal) |
| hydrogen sulfide scavenger | 2 | lb |

To study the removal of wet filter cake solids, filter cake drilling mud collected from the mud tanks of an actual drilling operation was filtered and used directly for solubility tests, without drying. 20 g samples of wet filter cake solids were soaked in 500 g of mud removal fluid at 270° F. for various time periods ranging from 24 hours to 96 hours. After the designated amount of time, the remaining solids were dried and weighed and the percentage of solids removed from each sample was calculated, based on the measured weight loss of the sample. The results of these tests are shown in Table 6. These results indicate that maximum removal of barite was achieved within the first 24 hours of soaking; soaking times of less than 24 hours may cause less than maximum barite removal.

TABLE 6

Effect of exposure time to mud removal fluid on dissolution of wet filter cake solids.

| Test time (hours) | Percentage of solids removed |
| --- | --- |
| 24 | 76.16 |
| 48 | 77.83 |
| 72 | 78.46 |
| 96 | 77.5 |

To study the removal of dry filter cake solids, filter cake drilling mud collected from the mud tanks of an actual drilling operation was filtered and dried at 80° C. for a few days. 20 g samples of dry filter cake solids were soaked in 500 g of mud removal fluid at 270° F. for various amounts of time ranging from 24 hours to 96 hours. After the designated amount of time, the remaining solids were weighed and the percentage of solids removed from each sample was calculated. The results of these tests are shown in Table 7. The mud removal fluid was more effective at removing the wet filter cake solids than at removing the dry filter cake solids. The percentage of dry filter cake solids removed by mud removal fluid increases slightly with increasing soaking time.

TABLE 7

Effect of exposure time to mud removal fluid on dissolution of dry filter cake solids.

| Test time (hours) | Percentage of solids removed |
| --- | --- |
| 24 | 69.41 |
| 48 | 71.27 |
| 72 | 73.42 |
| 96 | 74.39 |

To study the removal of actual filter cake, filter cake drilling mud was collected from the mud tanks of an actual drilling operation and formed into filter cakes in high pressure, high temperature (HPHT) cells. 200 g of collected filter cake drilling mud was placed into each HPHT cell and subjected to a temperature of 270° F. and a pressure of 400 psi to simulate conditions inside a drilling well for 3 hours to allow filter cake formation on a ceramic disk in the HPHT cell.

Figure 3B:
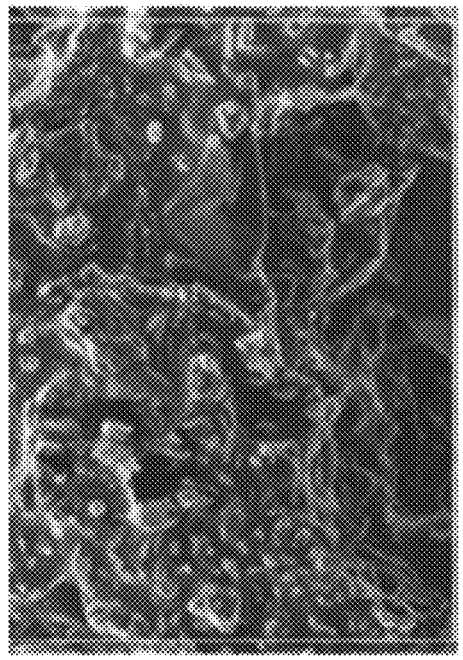
FIGS. 3A and 3B are scanning electron microscope (SEM) micrographs of filter cake before treatment with mud removal fluid.
Figure 3A:
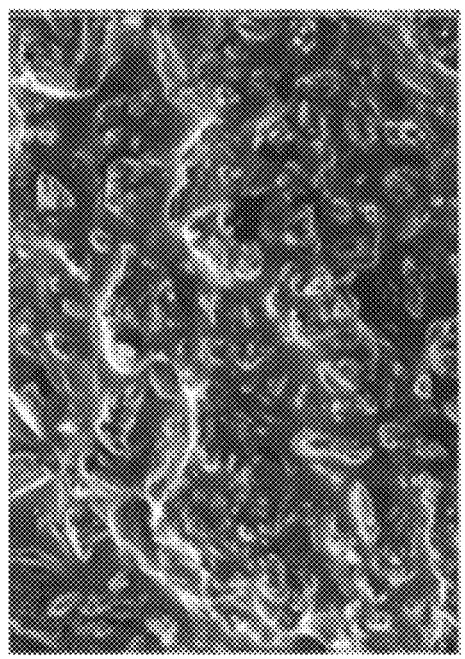
Figure 4A:
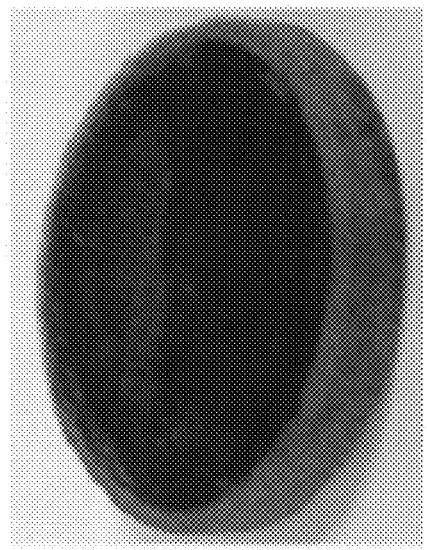
FIGS. 4A and 4B are optical photographs of filter cake before and after treatment with mud removal fluid, respectively.

XRF was used to determine the composition of the filter cake prior to treatment with mud removal fluid. The starting composition of two representative samples of filter cakes formed in HPHT cells is shown in Table 8. Referring to FIGS. 3A and 3B, SEM micrographs of the two filter cake samples show the presence of a polymer material surrounding solid particles, which are formed of a mixture of calcium carbonate and barite particles. FIG. 4A shows an optical photograph of a filter cake formed in an HPHT cell before treatment with mud removal fluid.

TABLE 8

Filter cake composition prior to treatment with mud removal fluid.

| Element | Sample 1 Weight percent | Sample 2 Weight percent |
| --- | --- | --- |
| O | 34.15 | 32.60 |
| Na | 2.99 | 3.17 |
| Mg | 2.07 | 1.83 |

TABLE 8-continued

Filter cake composition prior to treatment with mud removal fluid.

| Element | Sample 1 Weight percent | Sample 2 Weight percent |
|---|---|---|
| Al | 1.41 | 1.05 |
| Si | 2.81 | 3.33 |
| S | 8.52 | 9.04 |
| Cl | 1.68 | 1.77 |
| K | 0.39 | 0.27 |
| Ca | 4.33 | 3.97 |
| Fe | 2.91 | 0.98 |
| Ba | 38.75 | 41.99 |
| Total | 100.00 | 100.00 |

Following filter cake formation and after draining excess mud from the cell and leaving only the filter cake, 500 g of mud removal fluid was added to each HPHT cell and allowed to remain in the cell at 270° F. and 400 psi for various amounts of time ranging from 24 hours to 96 hours. After the designated amount of time, the remaining filter cake in each sample was weighed and the percentage of filter cake removed was calculated. The results of these tests are shown in Table 9. The percentage of filter cake removed by mud removal fluid increases with increasing time of exposure to the mud removal fluid in the HPHT cells.

TABLE 9

Effect of exposure time to mud removal fluid on dissolution of actual filter cakes in HPHT cells.

| Test time (hours) | Percentage of solids removed |
|---|---|
| 24 | 67.38 |
| 48 | 70.85 |
| 72 | 74.63 |
| 96 | 78.44 |

The composition of the remaining material in two filter cakes treated for 48 hours was determined using XRF and is shown in Table 10. The barite concentration in the filter cakes was reduced significantly by treatment with mud removal fluid, from around 40% (Table 8) to less than 3%, demonstrating the ability of mud removal fluid to remove barite from actual filter cakes. In addition, Mg and Ca compounds react with the mud removal fluid and were removed, and calcium chloride was removed by reaction with the mud removal fluid or by dilution following treatment.

TABLE 10

Filter cake composition following treatment with mud removal fluid at 270° F. and 400 psi for 48 hours.

| Element | Sample 1 Weight percent | Sample 2 Weight percent |
|---|---|---|
| O | 38.40 | 38.71 |
| Al | 3.26 | 3.46 |
| Si | 23.11 | 24.51 |
| S | 4.05 | 3.42 |
| K | 8.53 | 8.50 |
| F | 15.34 | 13.24 |
| Fe | 4.92 | 5.23 |

TABLE 10-continued

Filter cake composition following treatment with mud removal fluid at 270° F. and 400 psi for 48 hours.

| Element | Sample 1 Weight percent | Sample 2 Weight percent |
|---|---|---|
| Ba | 2.40 | 2.46 |
| Na | N/A | 0.47 |
| Total | 100.00 | 100.00 |

Figure 4B:
Figure 5B:
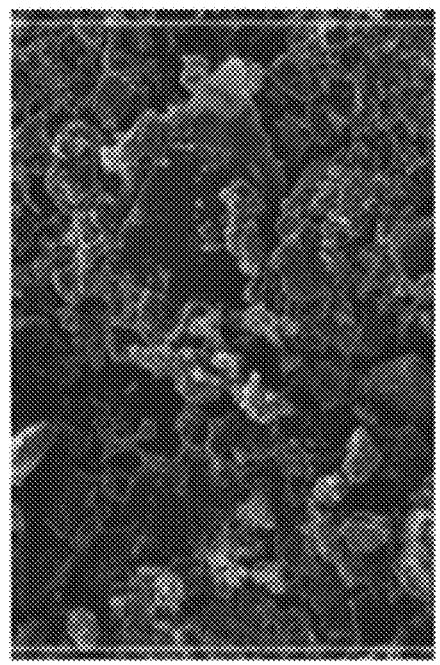
FIGS. 5A and 5B are SEM micrographs of filter cake after treatment with mud removal fluid.
Figure 5A:
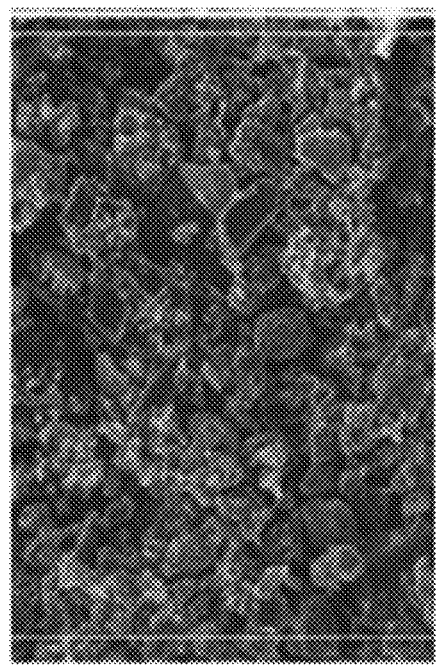

Referring to FIGS. 5A and 5B, SEM micrographs of the two treated filter cake samples show that the morphology of the material is more distinct than the filter cakes before treatment (FIGS. 3A and 3B), indicating that the both polymer material and barite particles have been removed. Referring also to the optical photograph of FIG. 4B, the treated filter cake sample contains primarily barite particles; calcium carbonate has been dissolved. The treated filter cake sample is visibly smaller and cleaner following treatment with mud removal fluid.

Example 3—Treatment of Desander Solids

Desander solids are solids collected from desanders during well back flow. Wet and dry desander solids collected from a 15 k desander at a flow rate greater than 30 mmscfd were treated with mud removal fluid to investigate the ability of the mud removal fluid to dissolve various types of desander solids. The mud removal fluid included 10% diethylene triamine pentaacetic acid (DTPA), 10% carbohydrase enzyme, and 20% potassium carbonate salt in an aqueous solution.

Figure 6B:
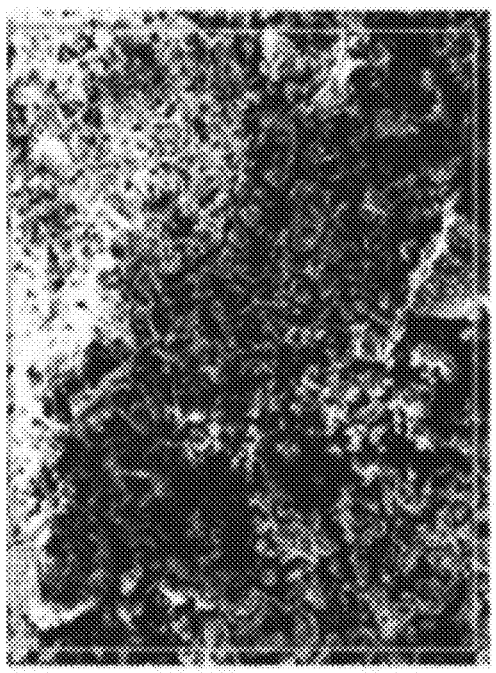
FIGS. 6A and 6B are SEM micrographs of desander solids before treatment with mud removal fluid.
Figure 6A:

XRF was used to determine the composition of the desander solids prior to treatment with mud removal fluid. The starting composition of two representative samples of desander solids is shown in Table 11. SEM micrographs of the two samples of desander solids are shown in FIGS. 6A and 6B.

TABLE 11

Composition of desander solids prior to treatment with mud removal fluid.

| Element | Sample 1 Weight percent | Sample 2 Weight percent |
|---|---|---|
| O | 34.04 | 36.08 |
| Mg | 1.04 | 0.82 |
| Al | 1.12 | 1.79 |
| Si | 6.70 | 4.87 |
| S | 10.87 | 11.09 |
| K | 0.34 | 0.63 |
| Ca | 1.87 | 1.72 |
| Fe | 1.86 | 2.09 |
| Ba | 42.15 | 40.90 |
| Total | 100.00 | 100.00 |

To study the removal of wet desander solids, desander solids were used directly for solubility tests, without drying. 20 g samples of wet desander solids were soaked in 500 g of mud removal fluid at 270° F. for various amounts of time ranging from 24 hours to 96 hours. After the designated amount of time, the remaining desander solids were weighed and the percentage of solids removed from each sample was calculated. The results of these tests are shown in Table 12. The percentage of wet desander solids removed by mud removal fluid increases slightly with soaking time.

TABLE 12

Effect of exposure time to mud removal fluid
on dissolution of wet desander solids.

| Test time (hours) | Percentage of solids removed |
|---|---|
| 24 | 70.95 |
| 48 | 71.54 |
| 72 | 72.18 |
| 96 | 75.68 |

To study the removal of dry desander solids, desander solids were dried at 80° C. for a few days. 20 g samples of dry desander solids were soaked in 500 g of mud removal fluid at 270° F. for various amounts of time ranging from 24 hours to 96 hours. After the designated amount of time, the remaining desander solids were weighed and the percentage of solids removed from each sample was calculated. The results of these tests are shown in Table 13. The mud removal fluid was more effective at removing the wet desander solids than at removing the dry desander solids. The percentage of dry desander solids removed by mud removal fluid increases slightly with increasing soaking time.

TABLE 13

Effect of exposure time to mud removal fluid
on dissolution of dry desander solids.

| Test time (hours) | Percentage of solids removed |
|---|---|
| 24 | 67.42 |
| 48 | 67.94 |
| 72 | 68.22 |
| 96 | 69.44 |

Figure 7B:
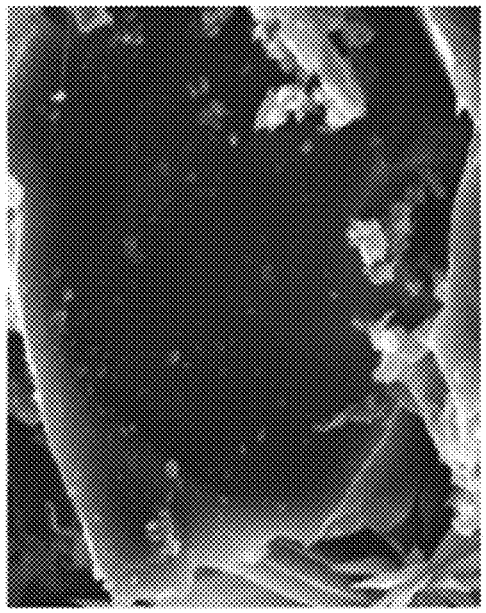
FIGS. 7A and 7B are SEM micrographs of desander solids after treatment with mud removal fluid.
Figure 7A:
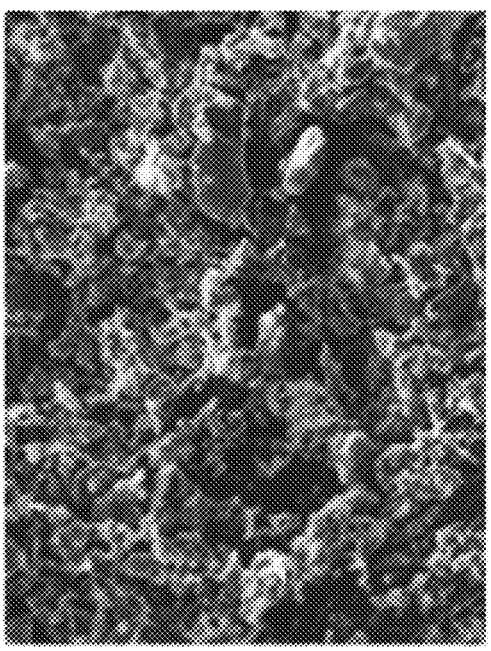

The composition of two dry desander solid samples following treatment with mud removal fluid for 48 hours was determined using XRF and is shown in Table 14. The barite concentration in the desander solids was reduced significantly by treatment with mud removal fluid, from about 40% to less than 2.5%, demonstrating the ability of mud removal fluid to remove barite from desander solids. Referring to FIGS. 7A and 7B, an SEM micrograph of the first treated dry desander solid sample shows a more distinct morphology than the non-treated sample (FIG. 6A). FIG. 7B is a magnified SEM micrograph of the sample shown in FIG. 7A, showing distinct crystal structure within the seemingly amorphous structure of FIG. 7A.

TABLE 14

Composition of desander solids following treatment
with mud removal fluid.

| Element | Sample 1 Weight percent | Sample 2 Weight percent |
|---|---|---|
| O | 40.76 | 54.63 |
| F | 11.63 | |
| Na | 0.48 | |
| Mg | 0.24 | |
| Al | 2.80 | |
| Si | 25.34 | 44.92 |
| S | 4.09 | |
| K | 7.60 | 0.18 |

TABLE 14-continued

Composition of desander solids following treatment
with mud removal fluid.

| Element | Sample 1 Weight percent | Sample 2 Weight percent |
|---|---|---|
| Fe | 4.62 | 0.26 |
| Ba | 2.46 | |
| Total | 100.00 | 100.00 |

Example 4—Mud Removal Fluid Volume

Figure 8:
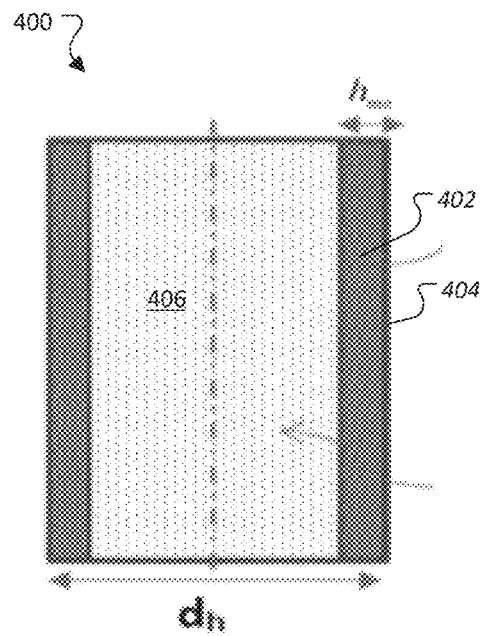
FIG. 8 is a diagram of a filter cake in a drilling formation.

FIG. 8 is a schematic representation of a filter cake 402 on a wall 404 of a drilling formation 400. A fluid 406, such as drilling mud, is present within drilling formation 400. A materials balance calculation can be performed to determine the volume of mud removal fluid appropriate to remove the filter cake 402.

The volume of filter cake 402 can be calculated as follows:

$$V_{fk} = \frac{\pi}{4} L [d_h^2 - (d_h - h_{mc})^2],$$

where $V_{fk}$ is the volume of filter cake 402, L is the length of drilling formation 400, $d_h$ is the diameter of the open hole of drilling formation 400, and $h_{mc}$ is twice the thickness of filter cake 402 (the factor of two accounting for the presence of filter cake 402 on opposite walls 404 of drilling formation 400).

The weight of filter cake 402 with volume $V_{fk}$ can be calculated as follows:

$$W_{fk} = V_{fk} \rho_{fk},$$

where $\rho_{fk}$ is the density of the filter cake solids forming filter cake 402.

The volume $V_{fl}$ of the open hole in drilling formation 400, and hence the volume of mud removal fluid that will fill the open hole, can be calculated as follows:

$$V_{fl} = \frac{\pi}{4} L (d_h - h_{mc})^2.$$

The ratio $V_R$ of the volume of filter cake ($V_{fk}$) to the volume of mud removal fluid ($V_{fl}$) filling the open hole in drilling formation 400 can be simplified to:

$$V_R = \frac{d_h^2 - (d_h - h_{mc})^2}{(d_h - h_{mc})^2}.$$

Filter cake solids generally have a density of between about 2 to 4 g/cm³, depending on the weighting material. The ratio of the weight of a filter cake to the volume of mud removal fluid that will fill the open hole is thus given by:

$$\frac{W}{V} = \frac{d_h^2 - (d_h - h_{mc})^2 \rho_{fk}}{(d_h - h_{mc})^2}.$$

Given the ratio $V_R$ of the volume of filter cake ($V_{fk}$) to the volume of mud removal fluid ($V_{fl}$) and the weight to volume ratio of a filter cake, the weight of a filter cake that can be removed by a given volume of mud removal fluid can be determined.

Figure 9:
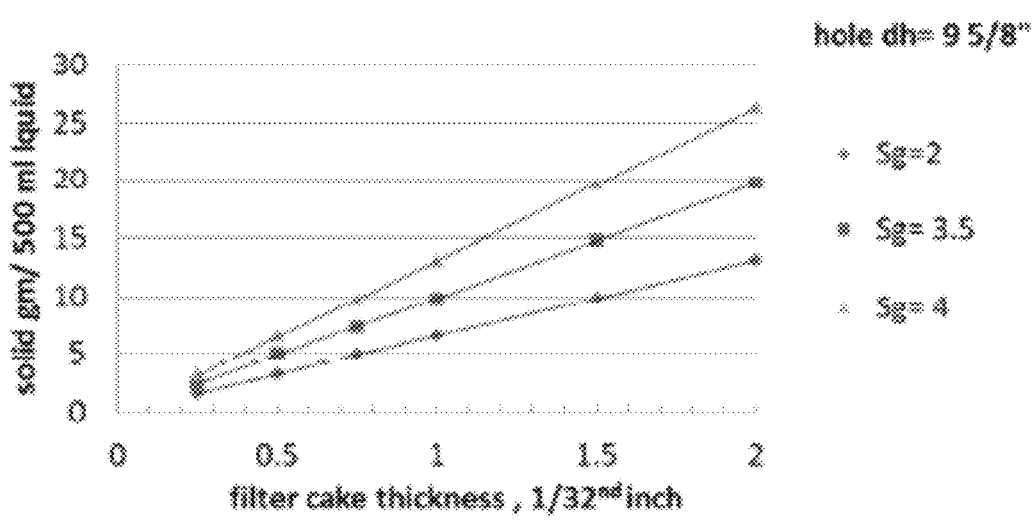
FIG. 9 is a plot of a target ratio of filter cake solids to mud removal fluid for various filter cake characteristics.

Referring to FIG. 9, in a specific example, for a gas well with a hole of diameter $d_h$ of 9-5/8 inches, the ratio of filter cake weight to mud removal fluid can be plotted as a function of filter cake thickness for various filter cake densities. The drilling mud used in Example 2 has a filter cake thickness of about $2/32^{nd}$ inches. For this mud, the plot in FIG. 9 indicates that a ratio of 20 g of filter cake solids in 500 mL of mud removal fluid is sufficient, which was the ratio used in the treatments described in Example 2.

Other implementations are also within the scope of the following claims.

What is claimed is:

1. A composition comprising:
   a drilling mud comprising barite particles and a polysaccharide polymer; and
   an aqueous solution comprising:
      between 10% and 15% by weight of a carbohydrase enzyme capable of reacting with the polysaccharide polymer at a potential of hydrogen (pH) greater than 8;
      between 5% and 40% by weight of an aminopolycarboxylic acid chelating agent capable of dissolving the barite particles; and
      between 5% and 20% by weight of a catalyst capable of promoting a reaction between the aminopolycarboxylic acid chelating agent and the barite particles, wherein the catalyst is selected from the group consisting of sodium hydroxide, potassium hydroxide, and iron chloride.

2. The composition of claim 1, in which the polysaccharide polymer comprises xanthan gum biopolymer, and in which the enzyme is capable of degrading the xanthan gum biopolymer.

3. The composition of claim 2, in which degraded components of the xanthan gum biopolymer are soluble in the composition.

4. The composition of claim 1, in which the aminopolycarboxylic acid chelating agent comprises one or more of diethylene triamine pentaacetic acid (DTPA) or ethylenediaminetetraacetic acid (EDTA).

5. A composition for dissolving drilling mud comprising barite particles and a polysaccharide polymer, the composition comprising:
   an aqueous solution comprising:
      between 10% and 15% by weight of a carbohydrase enzyme capable of reacting with the polysaccharide polymer at a potential of hydrogen (pH) greater than 8;
      between 5% and 40% by weight of an aminopolycarboxylic acid chelating agent capable of dissolving the barite particles; and
      between 5% and 20% by weight of a catalyst capable of promoting a reaction between the aminopolycarboxylic acid chelating agent and the barite particles, wherein the catalyst comprises iron chloride.

* * * * *